United States Patent [19]
Oonishi et al.

[11] 4,264,551
[45] Apr. 28, 1981

[54] RECORDED DISK REPRODUCING SYSTEM

[75] Inventors: Hajimu Oonishi, Hirakata; Kenichi Nishiuchi, Moriguchi; Tadaoki Yamashita, Hirakata, all of Japan

[73] Assignee: Matsushita Electrical Industrial Co., Ltd., Kadoma, Japan

[21] Appl. No.: 69,181

[22] Filed: Aug. 24, 1979

[30] Foreign Application Priority Data

Aug. 25, 1978 [JP] Japan .................. 53-104082

[51] Int. Cl.³ ............................................. B29D 17/00
[52] U.S. Cl. .................................... 264/107; 430/23; 430/231; 430/396
[58] Field of Search .................... 430/23, 321, 396; 264/107

[56] References Cited

U.S. PATENT DOCUMENTS

| | | | |
|---|---|---|---|
| 3,253,918 | 5/1966 | Condax | 430/396 |
| 3,642,477 | 2/1972 | Trusheim et al. | 430/396 |
| 3,701,659 | 10/1972 | Doo et al. | 430/396 |
| 3,860,382 | 1/1975 | Spiller et al. | 264/107 |
| 4,032,610 | 6/1977 | Spiller et al. | 264/107 |
| 4,108,660 | 8/1978 | Gale et al. | 430/321 |

*Primary Examiner*—Maurice J. Welsh
*Attorney, Agent, or Firm*—Stevens, Davis, Miller & Mosher

[57] ABSTRACT

A recorded disk preproducing system in which a signal pattern recorded on a master disk is transferred to a reproducing disk positioned in close contact with the master disk upon exposure to flashing light. The master disk includes a thin film of a light screening material such as in organic compound, chalcogen compound, or the like formed on a transparent glass substrate, and an information signal is recorded on the thin film as a pattern of varied light transmission. The reproducing disk has a thin film of a heat sensitive material such as amorphous chalcogen compound formed on a transparent resin substrate, and the optical density and/or a light reflectance of the heat sensitive thin film is varied in accordance with the recorded signal pattern of the master disk upon exposure to the flashing light.

9 Claims, 4 Drawing Figures

RECORDED DISK REPRODUCING SYSTEM

BACKGROUND OF THE INVENTION

1. Field of the Invention

The present invention relates to a recorded disk reproducing system for reproducing a recorded disk having information signals such as video signals or aural signals sequentially recorded in the form of variations of the light transmission and/or the light reflectance.

2. Description of the Prior Art

Recently a recording system has been proposed in various articles in which a recording medium is used consisting for example of an amorphous chalcogen compounds such as AsSe or GeTe which absorb the heat of a light. This causes a phase transformation or chemical reaction by the absorbed heat energy and thereby changes its light transmittance (transmission factor) and/or light reflectance (reflection factor), whereby a light beam having a relatively high light intensity, such as an argon laser beam is focussed into a small spot having a diameter of about 1 $\mu$m, modulated in accordance with the signals to be recorded, such as video signals or aural signals and then projected on the recording medium. The portions illuminated by the intense light beam are heated, chemically changed and cause blushing, thus changing their light transmittance and light reflectance and thereby sequentially recording them in the form of a pattern corresponding to the signals to be recorded.

Since this recording system requires no particularly high-intensity laser beam and the recording can be effected in the air, the system is attracting notice as a means of providing a video disk device capable of recording and reproducing signals. However, a practical video disk device as well as reproducing device using such recording medium have not been realized.

SUMMARY OF THE INVENTION

It is therefore the object of the invention to provide a system employing a recording medium of the type mentioned previously in which the light transmittance and/or the light reflectance are changed by heat energy so as to reproduce a recorded disk in which signals have been recorded.

BRIEF DESCRIPTION OF THE DRAWINGS

The present invention will become more apparent from the following detailed description taken in conjunction with the accompanying drawings, in which.

DESCRIPTION OF THE PREFERRED EMBODIMENTS

The invention will now be described in greater detail with reference to the illustrated embodiment.

Figure 1:
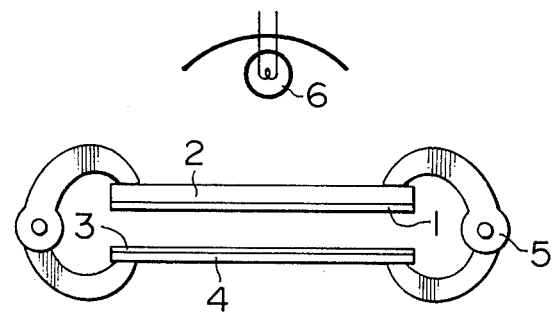
FIG. 1 is a schematic diagram showing an apparatus for performing a fine pattern reproducing method according to an embodiment of the invention.

FIG. 1 shows the principle of a reproducing method according to the invention. In the Figure, numeral 1 designates a layer of a master disk containing a pattern of different light transmittances (or intensities) corresponding to the recording signals and formed on a transparent substrate 2. Numeral 3 designates a heat-sensitive thin film member formed on a reproducing disk whose light transmittance and/or light reflectance are changed by heat energy and it is also formed on a transparent substrate 4. The master disk and the reproducing disk are brought close together by a pressure mechanism 5 in such a manner that the pattern-carrying layer 1 and the heat-sensitive thin film member 3 are arranged in close proximity to each other, whereby a flashing light source 6 is operated for a short period of time and the pattern on the master disk is reproduced on the reproducing disk. The heat-sensitive thin film member 3 is one in which the temperature is increased in a short period of time by absorbing the flashing light and the resulting heat results in some changes.

Figure 2:
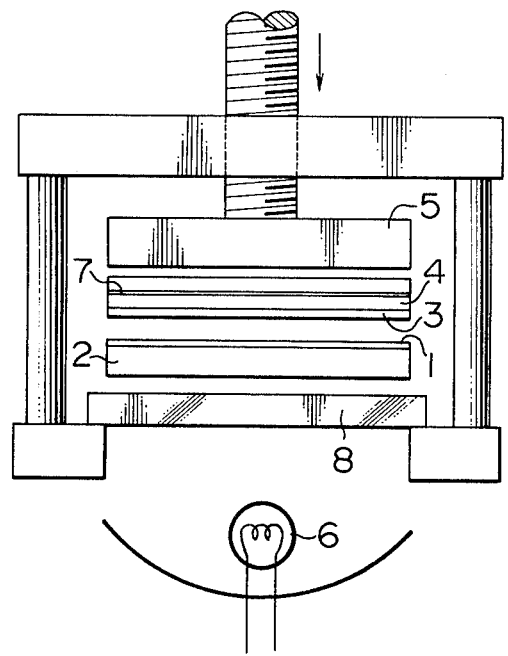
FIG. 2 is a side view of another embodiment of the invention.

FIG. 2 shows the construction of an exemplary apparatus for performing a reproducing method according to the invention. In the Figure, numerals 1 to 6 designate the same component parts as the counterparts of FIG. 1. Numeral 7 designates a rubber cushion member provided to ensure the application of a uniform pressure when the master and reproducing disks are pressed against each other. Numeral 8 designates a transparent glass subjected to a reinforcing treatment.

The flashing light source 6 may for example be a xenon discharge tube having a light pulse width of 1 $\mu$s to 1 m sec. When the pulse width is excessively large, the absorbed heat will be diffused and a blurred reproduction will be reproduced.

Next, the master and reproducing disks will be described. The master disk comprises a substrate and a light screening thin film layer formed on the surface of the substrate. A pattern of different light intensitives corresponding to the recording signals is formed in the thin film layer. The suitable materials for the thin film layer include light-screening materials, such as readily fusible or evaporable alloys, metal or semimetal oxides and their sulfides. When a beam of high intensity light such as argon gas laser light is focussed into a small spot having a diameter of about 1 $\mu$m, modulated in accordance with video signals or aural signals and projected on the light-screening thin film, the energy of the light is absorbed by the illuminated portions so that the temperature of those portions increases and some changes take place therein. Such changes may be divided broadly into two types. The first type includes those in which the thin film portion illuminated by the light is fused or evaporated, thus making a hole. In this case, the suitable materials for the thin film include low-melting alloys and compounds. The fusible materials include Bi alloys containing a small amount of gold, and the evaporable materials include compounds containing Te, Se and S. The second type includes those in which a chemical reaction takes place in the illuminated film portions and the portions become transparent. These materials, for example, include metal oxides, chalcogen compounds, etc., and the portions of such material heated by the projected light become transparent. The preferred materials for the transparent substrate of the master disk include glass and the like having a relatively large thickness. More specifically, they include those having excellent transparency, flatness, relatively high heat conductivity and large heat capacity. The requirements for the substrate will be described later in detail in connection with the reproducing disk. According to another form of the master disk, a very thin layer of transparent resin material may be formed on the thin film layer. If the thickness of this resin layer is not less than 1 $\mu$m, the reproduced pattern will be blurred.

The reproducing disk comprises a resin substrate and a heat-sensitive thin film applied to the surface of the substrate. If desired, a transparent resin layer may be applied onto the thin film member to a very small thickness. If the thickness is not less than 1 $\mu$m, the reproduced pattern will be blurred. The suitable materials for the heat-sensitive thin film member include those in which the heat of light is readily absorbed and the absorbed heat energy causes a phase transformation or chemical reaction, thus changing the optical density and/or the light reflectance. Amorphous chalcogen compounds may be cited by way of example. They include for example AsSe and GeTeSbS. These materials are such that the arrangement of the constitutent atoms is changed somewhat by the absorbed heat energy with the resulting considerable charge in the optical properties and the electric conductivity of the portions. Other exemplary materials include amorphous low oxide substances. They include for example low oxides of Te and Ge. These materials are also such that their optical properties are changed greatly by the heat energy of light. All of these materials require no after treatment such as development since their optical density and/or the light reflectance can be changed by the projection of light alone. Still other exemplary materials include those in which the heat of the material results in a chemical reaction in the material itself and hence a change in the optical density. The film thickness should preferably be greater than about 600 Å and less than about 3000 Å for all of these materials.

The requirements for the substrate of the reproducing disk must be different somewhat from the previously mentioned requirements for the master disk substrate. The same transparency and flatness as in the case of the master disk are required. The heat conductivity should preferably be as high as possible. Therefore, the use of a resin material is desirable.

Now the properties required for the constituent substrate and thin film member of the master and reproducing disks in relation to each other will be described in greater detail.

In the production of reproduced disks, the master disk and the reproducing disk are placed one upon another and the disks are exposed to a flashing light projected from the master disk side. In this case, it is essential to ensure that while the heat-sensitive thin film on the reproducing disk is allowed to cause changes in response to the light and heat, the light-screening thin film layer on the master disk is not allowed to change its characteristics in response to the flashing light. For this reason, the material for the master disk substrate must be high in both heat conductivity and heat capacity so as to prevent the temperature of the master disk thin film member from increasing as far as possible. For example, a glass substrate having a thickness of 2 to 20 mm should preferably be used. On the other hand, since it is essential for the thin film member of the reproducing disk to cause changes by the heat of the absorbed light, the heat conductivity of the substrate must be low enough to prevent escape of the heat in the thin film. Thus the suitable resin materials include acrylic resin, vinyl chloride, polyester, poly-carbonate, etc. The heat conductivities of these materials are lower than that of glass. In addition, the thickness must be reduced to less than 2 mm so as to decrease its heat capacity so as to be less than that of the master disk. While the light-screening thin film layer on the master disk is desired to have a high sensitivity to a laser beam which is used to write information in the film, no change must take place in the film during the flashing exposure. With the described construction of the substrates, in the master disk the temperature of the light-screening thin film member is not easily increased due to the high heat conductivity and high heat capacity of the substrate. On the other hand, in the reproducing disk the temperature of the heat-sensitive thin film member rises more easily than the light-screening thin film member due to the low heat conductivity and low heat capacity of the substrate.

Figure 3:
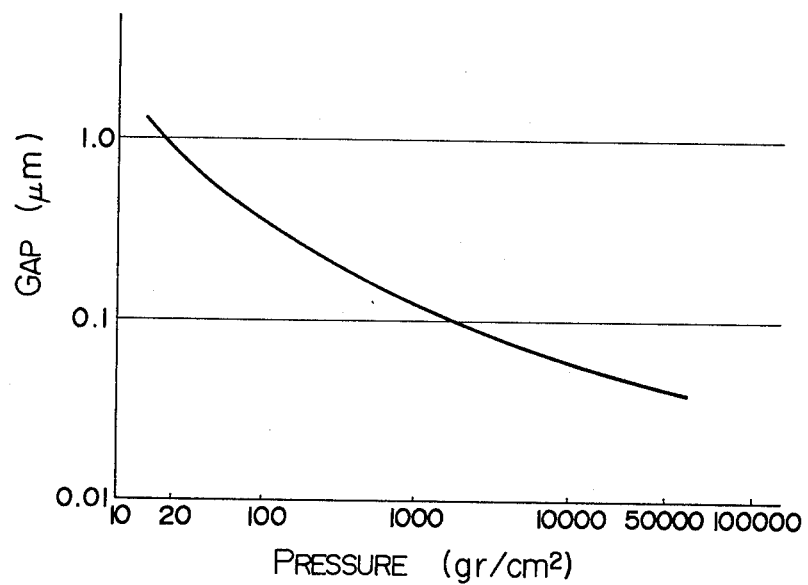
FIG. 3 is a graph showing the relation between the force for pressing a master disk against a reproducing disk and the gap therebetween in the reproducing method of the invention.

The reproducing method employing the above-described apparatus and the component parts will now be described in detail. The purpose of this reproduction is to exactly reproduce a pattern of the order of 1 $\mu$m containing video signals or the like which have been recorded with a high density and consequently the first main technical point is how to bring the master and reproducing disks into close contact with each other. To effect the transfer of the pattern of about 1 $\mu$m between the disks, the gap between the disks must be less than 1 $\mu$m. Of course, the contacting surfaces of the master and reproducing disks must be smooth and free of any dust. It is necessary to apply some pressure to bring the disks into close contact with each other. FIG. 3 shows the relationship between the applied pressure and the gap. The Figure shows the case where a glass sheet was used for the substrate of the master disk and the reproducing disk substrate consisted of an acrylic resin sheet of 1 m thick. The gaps were measured by measuring the interference fringes of light. The pressure of 20 gr/cm$^2$ resulted in a gap of about 1 $\mu$m and the pressure of 50,000 gr/cm$^2$ resulted in a gap of less than 0.1 $\mu$m. The application of pressures greater than 50,000 gr/cm$^2$ is not desirable since there is the danger of seriously damaging the recording surfaces. The application of pressures lower than 20 gr/cm$^2$ results in an excessively large gap and hence a blurred reproduced pattern. With the pressure applied in this way, the exposure of the master and reproducing disks to a flashing light results in an exact transfer of the fine pattern on the master disk to the reproducing disk.

When the master and reproducing disks are brought into close contact under such pressure, it gives rise to a technical difficulty in that the disks firmly adhere to each other and are not readily separable. This difficulty can be overcome by a measure which appears rather simple. Firstly, it is designed so that a material of such properties and thickness which provide some flexibility is used for either one or both of the reproducing disk and the master disk. For example, an acrylic sheet of about 1 mm thick has some flexibility. In the case of vinyl chloride sheets having thicknesses of up to about 1.3 mm, the sheets have some flexibility and can be bent to some extent. Where such materials are used, if ends of the master and reproducing disks which have been brought close together are bent very slightly outwardly to form a gap therebetween, air flows into the gap and in this way the disks can be spontaneously separated from each other. The required time is about 1 to 2 seconds in the case of disks which are about 30 cm in diameter. The gap initially formed by bending the disks will be about 0.1 to 0.5 mm.

Figure 4:
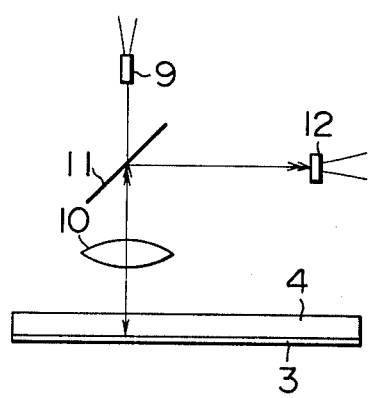
FIG. 4 is a schematic diagram showing a method of optically playing back a reproduced disk.

Next, the construction of the thus reproduced disk in relation to a playback unit will be described. FIG. 4 is a schematic diagram showing by way of example a method of playing back the signal pattern formed in the surface of the reproduced disk. In the Figure, numeral 3 designates the heat-sensitive thin film or the recording surface of the reproduced disk, and 4 the transparent resin substrate. The light emitted from a semiconductor laser 9 is focussed through a condensing lens 10 and projected on the recording surface 3 through the substrate 4. The light containing the signals and reflected from the recording surface 3 is reflected and bent by a half mirror 11 and the light is then received by a light detector 12.

As mentioned previously, the light is projected from the side of the heat-sensitive thin film of the reproducing disk during the reproducing operation. During the playback operation the light is projected from the opposite side or the substrate side and the signals are read. Since the heat-sensitive thin film member has been formed to a thickness of as thin as 1000 to 2000 Å, when the reproducing light is projected from one side, the resulting changes extend to the other side and the signals are reproduced. On the other hand, the playback is effected by projecting the light from the substrate side. If the light is projected from the thin film side, the dust deposited on the thin film directly result in noise. On the contrary, if the light is projected from the substrate side, the dust deposited on the thin film causes no noise. The reason is that the light is mainly reflected from the surface of the thin film on the substrate side and the light is not affected by the dust deposited on the opposite side. Also, the dust deposited on the surface of the substrate causes no noise. The reason is that the playback light is focussed to the surface of the thin film and the light is spreaded on the surface of the substrate. The described construction of the reproduced disk as well as the methods of reproduction and playback are extremely advantageous from the standpoint of eliminating noise due to dust. To form a protective layer on the thin film layer 3 after the reproduction is desirable from the standpoint of record surface protection.

A specific example of the invention will now be described.

[EXAMPLE 1]

In this example, a master disk comprised a smooth glass substrate (20 cm in diameter and 10 mm in thickness) and a thin film of Bi-Au alloy deposited on the substrate by evaporation. A dot pattern was formed in the deposited thin film by vaporizing the thin film in accordance with the signals to be recorded by means of an argon laser light which was focussed to a small spot through a lens. A reproducing disk comprised a smooth-surfaced vinyl sheet (20 cm in diameter) and a vacuum-deposited thin film such as ① a thin film of chalcogen compound (a composite compound of S, Se and Te) such as AsSeSGe or GeTeSbS or ② a low oxide thin film such as $TeO_2$, $GeO_2$ or $Mo_2O_3$. These disks were designed for contact reproduction purposes.

The properties of the thin films in ① and ② were such that when the film was illuminated by a light, the heat of the light was absorbed and the bond between the constituent atoms was changed, producing an optical density. The master disk and the reproducing disk were arranged one upon another in such a manner that the thin film surfaces were positioned inside and a transparent glass subjected to a reinforcing treatment was placed on the outside of the assembly. A pressure of about 100 gr/cm² was applied to the sides of the assembly and in this condition the assembly was momentarily illuminated from the master disk side by means of xenon flashing lamps. This resulted in an increase in the optical density of the deposited thin film on the reproducing disk corresponding to those portions of the pattern on the metal thin film of the master disk which transmitted the light and a reversed pattern of the pattern on the master disk was produced on the reproducing disk.

In this example, 20 xenon flashing lamps were arranged in the form of a planar array at a distance of 3 cm from the master disk and the lamps were operated by supplying an electric input of 150 joules/lamp per flashing.

The method of reproducing fine patterns according to the invention has been described in detail. While, in the prior art process of reproducing video disks in which signals are recorded in the form of impressions, the required production time per disk is on the order of 1 minute due to the necessity to perform the operations of heating and cooling, in accordance with the present invention and reproduction can be accomplished in less than 0.1 second. Even if the time required for the pressing and separating operations are included, the total production time per disk will amount only to about 15 seconds. Since the materials for the reproducing disks require no such additional treatments as developing treatment, there are advantages of simplification in the overall production steps with the resulting reduction in the manufacturing cost of reproduced disks and so on.

We claim:

1. In a recorded disk reproducing method in which a master disk, including on a substrate thereof a layer having a pattern of different light transmittance, and a reproducing disk, including a heat-sensitive thin film member on a substrate, are brought into close contact with each other with pressure applied and the heat-sensitive thin film member is exposed to a flash of light through the layer of the master disk so that different optical densities are caused in the heat-sensitive thin film member due to absorption of light energy and due to raised temperature at portions illuminated by the flash of light, using a glass plate of high heat conductivity and high heat capacity as the substrate of said master disk, and using a resin plate as the substrate of said reproducing disk, said resin plate satisfying at least one of two conditions including; the heat conductivity is lower than that of said glass plate, and the heat capacity is smaller than that of said glass plate.

2. A recorded disk reproducing method comprising the steps of:

projecting a beam of light to a master disk comprising a first thin film layer formed on a light-transmitting first substrate, said first thin film layer having a light transmission varying in accordance with the energy of projected light, the intensity of said light beam being modulated in accordance with signals to be recorded, said light beam being projected on said first thin film layer, whereby a record pattern of variations of said light transmission corresponding to said signals to be recorded is formed in said first thin film layer, wherein said first thin film layer comprises a thin film of inorganic compound, and wherein said thin inorganic compound film is selectively fused or evaporated by a laser beam having the intensity thereof modulated in accordance with said signals to be recorded whereby forming small holes through said selectively fused or evaporated portions and varying the light transmission of said portions, arranging said master disk in close proximity to a reproducing disk comprising a second thin film layer formed on a second substrate and having a light transmission and light reflectance varying in accordance with the energy of projected light, said second substrate having a heat conductivity and heat capacity lower than those of said first substrate, said master disk and said reproducing disk being arranged in such a manner that said first and second thin film layers are arranged in close proximity to each other; and projecting a flashing light on said second thin film layer through said first substrate and said first thin film layer whereby a pattern of variations of said light transmission and said reflectance corresponding to said signals to be recorded is formed in said second thin film layer.

3. A recorded disk reproducing method comprising the steps of:

projecting a beam of light to a master disk comprising a first thin film layer formed on a light-transmitting first substrate, said first thin film layer having a light transmission varying in accordance with the energy of projected light, the intensity of said light beam being modulated in accordance with signals to be recorded, said light beam being projected on said first thin film layer, whereby a record pattern of variations of said light transmission corresponding to said signals to be recorded is formed in said first thin film layer, wherein said first thin film layer comprises a thin film of chalcogen compound or a thin film of oxide, and wherein said first thin film is selectively transformed with a laser beam having the intensity thereof modulated in accordance with said signals to be recorded whereby varying the light transmission of said selectively transformed portions, arranging said master disk in close proximity to a reproducing disk comprising a second thin film layer formed on a second substrate and having a light transmission and light reflectance varying in accordance with the energy of projected light, said second substrate having a heat conductivity and heat capacity lower than those of said first substrate, said master disk and said reproducing disk being arranged in such a manner that said first and second thin film layers are arranged in close proximity to each other; and projecting a flashing light on said second thin film layer through said first substrate and said first thin film layer whereby a pattern of variations of said light transmission and said reflectance corresponding to said signals to be recorded is formed in said second thin film layer.

4. A method according to any of claims 1, 2 or 3, wherein said second thin film layer comprises a thin film of chalcogon compound.

5. A method according to any of claims 1, 2 or 3, wherein said second thin film layer comprises a thin film of low oxide.

6. A method according to any of claims 1, 2 or 3, wherein said second substrate is made of a light transmitting material.

7. A method according to any of claims 1, 2 or 3, wherein said reproducing disk has a flexibility whereby when said master disk and said reproducing disk which were held close together and subjected to exposure are to be separated, a portion of the outer peripheral portion of said reproducing disk is bent outwardly by utilizing said flexibility thereby introducing air through said bent portion and separating said disks from each other.

8. A method according to any of claims 1, 2 or 3, wherein a pressure within the range from 20 to 50,000 gr/cm$^2$ is applied to said master disk and said reproducing disk to bring the same into close contact with each other.

9. A method according to any of claims 1, 2 or 3, wherein a rubber cushion plate is placed on said second substrate side of said reproducing disk, whereby said reproducing disk is pressed against said master disk through said cushion plate.

* * * * *